Nov. 24, 1964   R. F. HAUTLY   3,158,833
SEISMOMETER
Filed July 5, 1960

INVENTOR
RUDOLPH F. HAUTLY
BY
ATTORNEY

United States Patent Office 3,158,833
Patented Nov. 24, 1964

3,158,833
SEISMOMETER
Rudolph F. Hautly, 630 Kirkshire, Kirkwood, Mo.
Filed July 5, 1960, Ser. No. 40,891
4 Claims. (Cl. 340—17)

Mechanical seismometers or seismographs in general consist of a large mass, suspended by means of a spring from the frame of the seismometer, which rests on the ground. A seismic wave, transmitted through the ground, moves the frame relative to the suspended mass. A pointer or pen attached to the mass traces a record of such movements on a chart of paper attached to the frame. Or, a beam of light is reflected from a mirror fixed to the mass and focused on a strip of photographic paper mounted on the frame. The paper is of course is driven in a direction perpendicular to the relative motion of the pen; this is accomplished by the use of a clock drive.

Electromagnetic seismometers are of two types: the moving coil or induction type, and the variable reluctance type, both well known in the art. The moving coil type positions a coil of many turns of wire in a magnetic field of substantially constant strength. Either the coil can be on the suspended mass and the magnet exerting the field can be on the frame or these fixed locations can be reversed. When the mass and the frame are in relative movement, the coil and the magnetic field are in relative movement. The cutting of the lines of magnetic force by the coil generates or induces electrical currents or potentials in the coil.

In the variable reluctance variety of seismometer a permanent magnet is suspended above an iron armature which is surrounded by a coil. The air gaps between the poles of the permanent magnet and the iron armature are varied by the relative motion of the mass and the frame. The total flux flowing through the magnetic circuit at a given instant is dependent primarily upon the magneto motive force of the magnet divided by the reluctance of the magnetic circuit which includes the air gaps. As these gaps are varied by the impressed seismic waves, the reluctance of the magnetic circuit is varied with a consequent increase or decrease in the flux flowing in the magnetic circuit. The change in flux generates an electric potential in the coil on the iron armature.

In both the above types of seismometers the electrical currents or potentials generated are impressed upon a galvanometer, resulting in a deflection of the galvanometer movement which can be utilized to form a permanent record.

For extremely sensitive works, all three of the above types of seismometers suffer from one major obstacle. The spring suspension of the mass from the frame of the seismograph is temperature-sensitive. As the temperature increases and decreases the spring lengthens and shortens and consequently itself produces a relative motion of the mass with respect to the frame. While it is true that such temperature changes usually are of a much longer periodicity than those of the seismic waves, and hence can easily be distinguished from the shorter period waves, their principal effect is to change the very quantities which are intended to remain constant for the most efficient operation. For instance in a variable reluctance seismograph, the length of the air gaps will be changed, in turn varying the limits of potentials available for measuring the relative movement.

Many modifications have been utilized to minimize the temperature effect, such as choosing a spring material which has a low temperature coefficient or a negative one; the latter alternative serves only to reverse the effect. Certain recent experiments and studies have attempted to measure longer period seismic so that the temperature effect has become critical. My construction removes the obstacle of the temperature effect by utilizing a suspension with a zero temperature coefficient.

A principal object of my invention is to provide a temperature-insensitive seismometer suspension construction. The importance of this novel suspension construction can only be realized by reviewing the history of seismographs. In the entire period dating back to approximately 1850, when earthquake measurement first began, every seismograph built has been temperature sensitive.

A further object of my invention is to provide a linear seismometer construction for mechanical seismometers whch is extremely accurate as well as being independent of temperature.

An additional object is to provide a magnetic suspension system for electromagnetic seismometers in which the suspension system magnets form a part of the transducer assembly. In this construction the magnets which hold the mass suspended from the frame have a second function; they form a principal part of the motion-detection system.

Another object of my invention is to provide a seismometer construction in which the mass is carried by one magnet and the frame is fixed integrally to another magnet. The two magnets form the suspension system.

Another object of my invention is to provide a seismometer suspension system composed of a rotatable magnet disposed within a stationary magnet.

These and other objects of my invention will be apparent to those skilled in the art from a study of the accompanying drawings forming a part of this application and illustrating in the different figures views of the particular embodiment of the invention.

Figure 1:
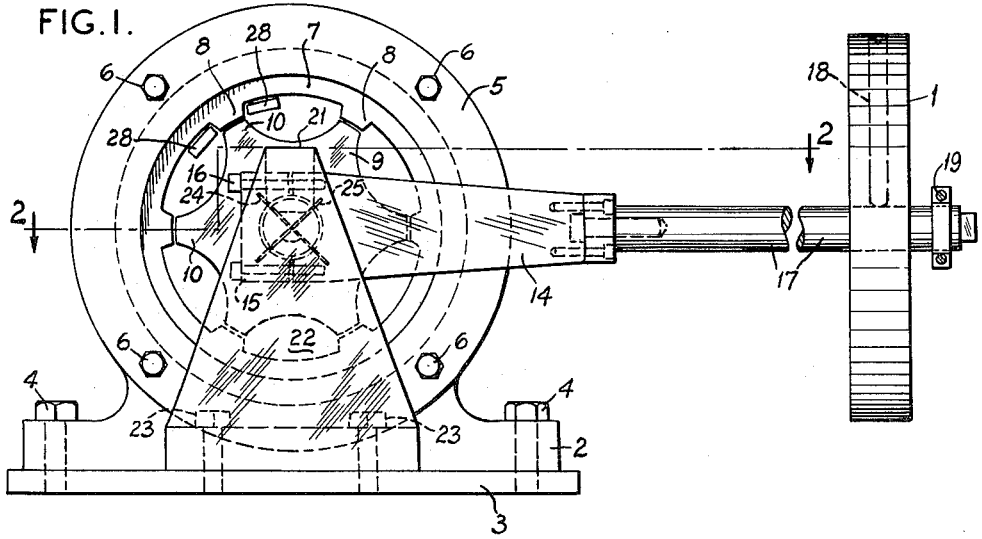
FIGURE 1 is a side elevational view of a simplified seismometer construction embodying the invention.
Figure 2:
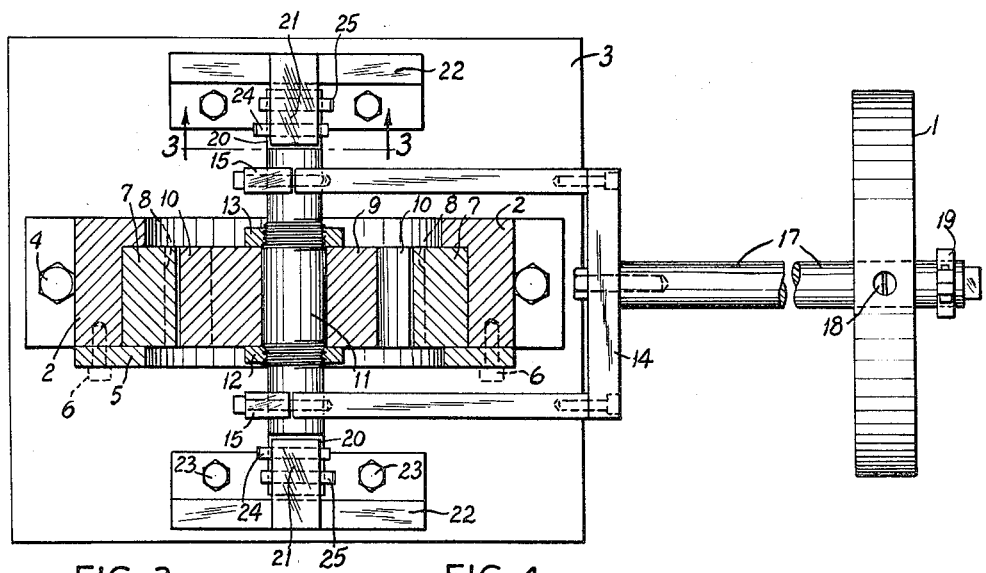
FIGURE 2 is a top plan view, partly in cross-section taken along the line 2—2 of FIGURE 1.

The seismometer consists in general of a mass 1 movable in a vertical sense with respect to a frame 2, attached to base plate 3, by the bolts 4, 4. The frame 2 consists of a metal element somewhat similar to an electric motor housing, complete with an end plate in the form of a flat annular ring 5, bolted with bolts 6, 6 to the frame 2.

The frame 2 and the end plate 5 hold mounted between them and integral with them the stator magnet 7, which is in the form of a cylindrical wheel, and having 6 poles designated with the numeral 8, projecting inwardly toward the center of the stator magnet.

Suspended freely within the stator magnet 7 is the rotor magnet 9, which similarly has 6 poles, designated by the numeral 10. It will be understood that the number of poles on the two magnets is chosen for convenience and may be any even number. It will however be realized that adjacent poles on the same magnet will be opposite in sense, that is a north pole will be between two south poles, and in fact they will alternate in position around the circumference of each magnet.

The rotor magnet is provided with a central hole through which is disposed the shaft 11. On shaft 11 adjacent the sides of the rotor magnet 9 are cut threads and mounted upon the threads are the nuts 12 and 13, whose function is to maintain the shaft and the rotor magnet fixed integrally.

Mounted upon the shaft 11 and also integral therewith is the yoke 14, in the shape of a large U. The yoke 14 is attached to the shaft at its open ends by means of a pair of clevises 15, which are seen in FIGURE 1, partly in dotted line, to be U-shaped. Each clevis is bolted to the yoke by two bolts, 16.

The yoke 14 carries at its opposite end an extender shaft or moment arm 17, shown split to indicate its relatively greater length. The moment arm 17 has the mass 1 fixed upon it by means of a set screw 18. A stop 19 is bolted upon the end of the extender shaft at the extreme right in the figures.

Figure 3:
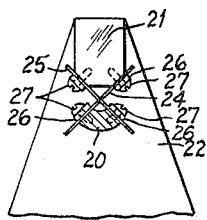
FIGURE 3 is a side elevational detail view of the strip hinge construction, taken along the line 3—3 of FIGURE 2.
Figure 4:
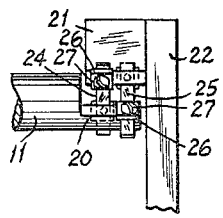
FIGURE 4 is a side elevational detail view of the strip hinge of FIGURE 3, rotated through 90° and with more of the shaft showing.

To prevent sidewise movement of the rotor magnet, that is to localize the rotor magnet within the stator magnet, an arcuate-shaped trunnion is formed by machining upon each end of the shaft 11. The arcuate-shaped trunnion 20 can be seen best in FIGURES 3 and 4. A cooperative trunnion cradle 21 is formed from a rectangular block of metal, with two of its ends chamfered at 45°. This trunnion cradle 21 is an integral part of the cradle mounting plate 22 bolted to the base plate 3 by means of the bolts 23.

The trunnions 20 are chamfered similarly to the ends of the trunnion cradles, at a 45° angle. Each trunnion 20 is rotatably hung, that is suspended from its cooperative trunnion cradle 21 by means of a pair of strip hinges 24 and 25. These strip hinges are in the form of an extremely thin strip of metal fastened to the chamfered edges of the trunnions and the trunnion cradles by the hinge mounting plates 26 and the bolts 27.

The operation of the seismometer is simply understood. A seismic wave moves the frame up and down. The mass 1 is uncoupled from the earth movement and remains fixed in space. Therefore a relative vertical motion of the mass 1 and the frame and base plate occurs. This vertical motion is reflected by a relative rotation between the stator magnet 7 and the rotor magnet 9. Relative rotation of the two magnets rotatively displaces the poles of the rotor from their quiescent positions immediately opposite the poles of the stator, as shown in FIGURE 1. This rotative displacement is resisted by a restoring moment or force exerted by the fields of the pole pieces. It will be noted that the trunnions 20 and the trunnion cradles 21 form a frictionless bearing, serving only to restrict movement of the shaft and rotor magnet to rotative motion. The suspension system is free of temperature distortion since it is essentially a magnetic suspension system dependent on field strengths of the magnets, which do not vary with temperature.

The magnetic suspension construction described for a mechanical seismograph above can be utilized for a further purpose in electromagnetic seismometers; as will be shown.

For an induction or coil type of seismograph, either the stator or the rotor pole pieces can be wound with many turns of fine wire. Each pole on the stator magnet can be so wound. To illustrate this I have shown two positions, denoted with numeral 28 in FIGURE 1 as positions through which a wire would be wound around the intervening pole piece to form a coil on a stator magnet. Relative movement of the rotor magnet poles with respect to the coils described will generate currents in a manner similar to the ordinary induction type of seismometer.

Similarly a variable reluctance seismometer can be built in which a slug of soft iron is mounted on either the rotor magnet or the stator magnet. Whichever the slug is mounted on, there will be an air gap between it and the opposite pole on the outer magnet. The slug is wound in the conventional manner with a coil which is the sensing coil or the transducer coil. Relative movement of the stator magnet and the rotor magnet causes a variation in the size of the air gap and hence a variation in the reluctance of the air gap. The variable reluctance is the detector element of the transducer assembly in the configuration as it is in the ordinary variable reluctance seismometer. As an illustration I would mount the slug and the coil wound upon it at one of the positions 28 of FIGURE 1 to form the air gap. In both types of electromagnetic seismometers of course, the coil as well as the slug and the coil on it, must be positioned so that they will not project into the gap between the pole pieces on the stator and those on the rotor, since they must not interfere with the rotation of the rotor with respect to the stator.

While I have described my invention in connection with certain specific embodiments thereof and in connection with certain varied approaches, it is to be understood that these are merely by way of illustration and that I am not limited thereby but only by the appended claims which should be construed as broadly as the prior art will permit.

I claim:

1. In a seismometer having a reference frame, a rotary magnetic suspension system consisting of a hollow cylindrical stator magnet integral with said reference frame, a rotor magnet magnetically suspended within said stator magnet and rotatable with respect thereto, a shaft disposed through the central axis of said rotor magnet and integral therewith, a U-shaped yoke mounted on said shaft, and a mass mounted upon the yoke, said mass subject to relative vertical motion with respect to said reference frame, said vertical motion reflected by relative rotation between said stator and rotor magnets.

2. In a seismometer having a reference frame, a rotary magnetic suspension system consisting of a stator magnet in the form of a magnetized hollow cylinder provided with magnetic poles projecting centerwardly and integral with said reference frame, a rotor magnet in the form of a cylinder provided with poles projetcing outwardly, said rotor magnet disposed within said stator magnet, and said rotor magnet poles disposed adjacent to the poles of said stator magnet and rotatable with respect to said stator magnet poles, a shaft disposed through the central axis of said rotor magnet and provided with ends projecting therethrough, a U-shaped yoke whose ends are integrally mounted on said ends of said shaft, an extender shaft mounted integrally on the base portion of said U-shaped yoke, and a mass mounted upon said extender shaft, said mass subject to relative vertical motion with respect to said reference frame, said vertical motion reflected by relative rotation between said stator and rotor magnets.

3. A seismometer according to claim 2 in which there is provided a transducer assembly consisting of a coil of multiple turns wound upon a stator pole of said stator magnet to generate induced currents in said coil upon relative rotative motion of said rotor poles with respect to said stator poles and coil to detect said relative rotative motion as a measure of the vertical relative motion of said mass with respect to said frame.

4. A seismometer according to claim 2 in which there is a variable reluctance transducer consisting of a slug of iron and a coil of multple turns wound upon said slug, said slug disposed between adjacent stator poles so that an air gap is formed between said slug and an adjacent pole of said rotor magnet, said gap varying in size upon relative rotative motion of said stator poles and rotor poles, and said slug of iron, said variability of said air gap reflecting the relative vertical motion of said mass with respect to said reference frame.

References Cited by the Examiner

UNITED STATES PATENTS

| 2,564,484 | 8/51 | Kuehni | 73—136 |
| 2,659,065 | 11/53 | Cordell | 340—17 |
| 2,913,701 | 11/59 | Wachholz | 340—17 |

SAMUEL FEINBERG, Primary Examiner.

CHESTER L. JUSTUS, S. SRAGOW, Examiners.